March 21, 1944. P. BOGNER 2,344,589
SOLDERING DEVICE
Filed April 17, 1940 2 Sheets-Sheet 1
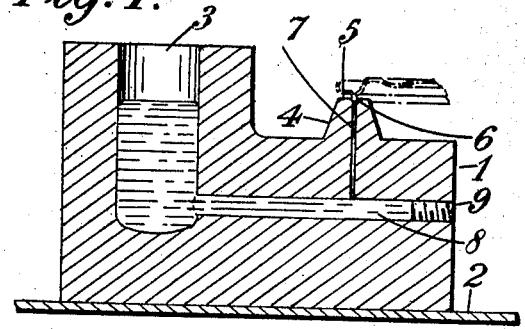
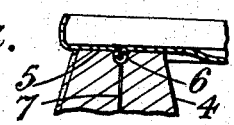
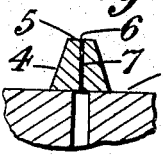
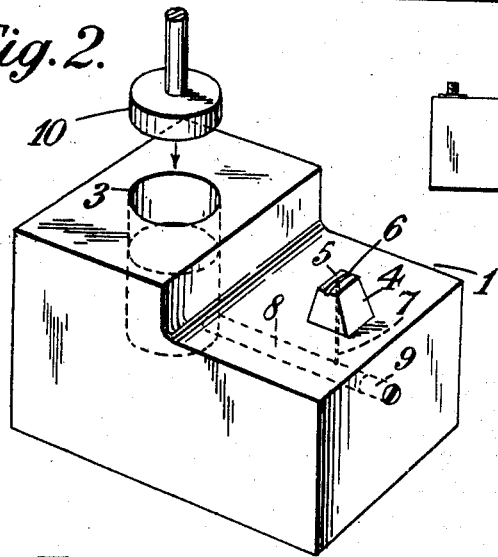
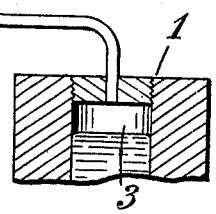
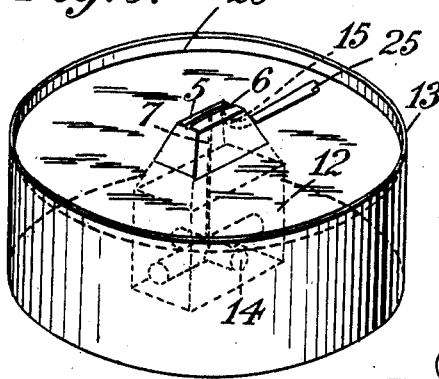
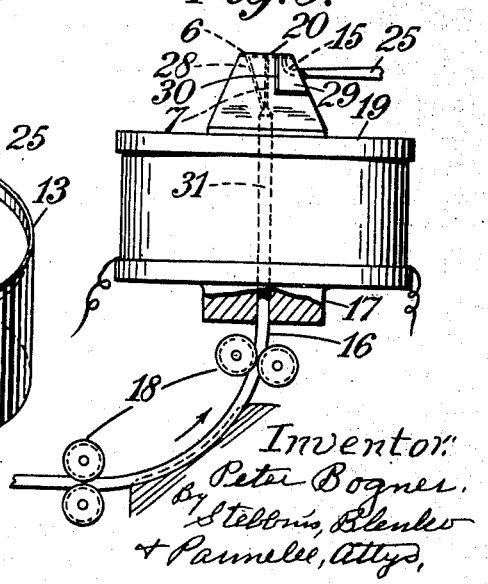
Inventor:
Peter Bogner
by Stebbins, Blenko
& Parmelee, Attys.

March 21, 1944.  P. BOGNER  2,344,589
SOLDERING DEVICE
Filed April 17, 1940  2 Sheets-Sheet 2
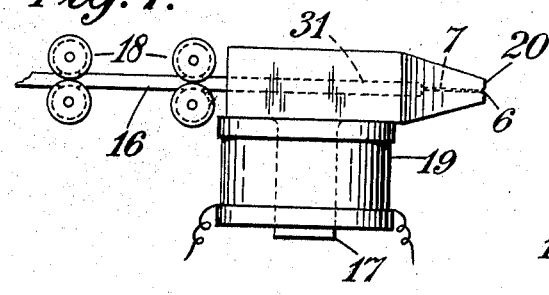
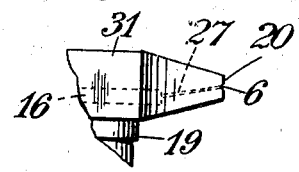
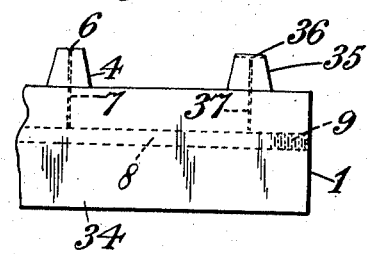
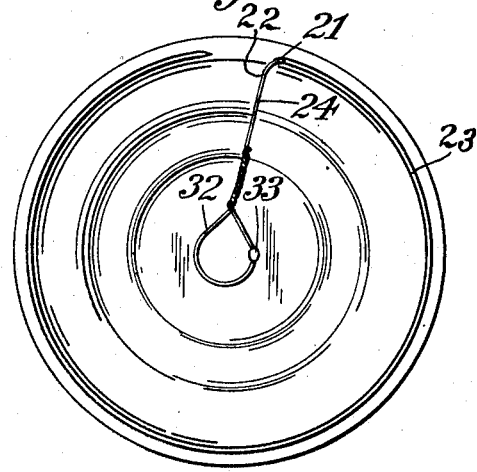
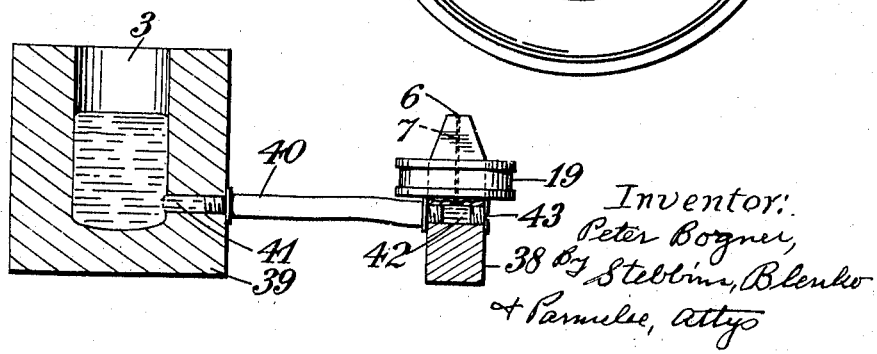
Inventor:
Peter Bogner,
by Stebbins, Blenko
& Parmelee, attys Patented Mar. 21, 1944

2,344,589

UNITED STATES PATENT OFFICE 2,344,589

SOLDERING DEVICE

Peter Bogner, London, England, assignor to Saml. Hanson & Son, Limited, London, England, a British company Application April 17, 1940, Serial No. 330,202
In Great Britain April 19, 1939

3 Claims. (Cl. 113—59)

The invention relates to a soldering device and has for an object the provision of an improved device of this kind whereby certain soldering operations may be simplified.

The invention provides a soldering device comprising a member providing a solder-applying surface and having an internal passageway leading to the solder-applying surface and means whereby molten solder may be supplied through the passageway to the applying-surface.

In one preferred form of the device the soldering surface is formed on a tip projecting from the body of the member, and it is also preferred that the device be so constructed and arranged that, in use, the solder-applying surface is directed otherwise than downwardly.

The solder-applying means may be arranged to maintain a continuous supply of solder to the applying-surface continuously to replace the solder on this surface as it is removed by the work. For this purpose the means, in one arrangement, comprise a reservoir for molten solder having a connection to the solder-applying surface through the passageway, the reservoir being positioned at such a level in relation to the applying-surface and the passageway being of such cross-sectional dimensions that the supply of molten solder will be maintained at the surface by capillary action. Alternatively or in addition the solder-supplying means may comprise means for applying controlled pressure to the molten solder to force it through the passageway to the applying surface.

In another arrangement the solder-supplying means are such that the solder is fed continuously or intermittently into the passageway in wire or strip form and is then melted, the molten solder being fed along the passageway to the applying-surface either by capillary action or by the pressure exerted by the incoming wire or strip or by both capillary action and pressure.

The device may be arranged for use with an independent source of heat (e. g., a hot plate) for melting the solder and for maintaining in molten form the solder in the passageway and on the applying-surface. In the case of a device which is to be used in conjunction with a hot plate or the like it may be made of a heat conducting material to conduct the heat to the solder in the passageway and on the solder-supplying surface. Alternatively the device may incorporate, as an integral component, heating means for melting the solder and for maintaining it in the molten form or it may have integral heating means for maintaining the solder molten in the passageway and on the supplying-surface and be arranged for use with independent heating means for melting the solder.

The device may, if desired, include an additional internal passageway leading to the solder-applying surface and arranged for feeding flux to that surface.

Some specific examples of the invention will now be described with reference to the accompanying drawings of which Figures 1 to 10 are purely diagrammatic and in which—

Figure 1 is a section through one form of soldering device, Figure 1a showing a detail on a larger scale;

Figure 2 is a perspective view of the device shown in Figure 1 modified to include a plunger for applying pressure to the solder;

Figure 3 is a detail view showing a further modification of the device shown in Figure 1;

Figure 4 is a detail view showing alternative means for applying pressure to the solder;

Figure 5 is a perspective view showing another form of the device;

Figure 6 is a side view showing another form of soldering device in which the solder is fed in the form of a wire;

Figure 7 is a view showing an alternative arrangement of the device shown in Figure 6;

Figure 8 is a detail view corresponding to a portion of Figure 7 showing a modified arrangement of the passageway for the solder;

Figure 9 is a side view showing a further modification in which two soldering tips are provided;

Figure 10 is a side view showing a still further form of soldering device; and

Figure 11 is a plan view of a can end-closure provided with a rip-wire.

Like reference numerals indicate like parts in the several figures of the drawings.

The device shown in Figures 1 and 2 consists of a metal block 1 mounted on a base 2 which is, conveniently, the surface of a hot plate heated in any convenient way, for example electrically or by a gas flame or otherwise. The block 1 is formed with a hole 3 forming a reservoir for molten solder. The block is also formed with a projecting tip 4 of which the upper surface 5 is provided with a groove 6 constituting the solder-applying surface and lying at a level which is at, or slightly above, the convenient level for the surface of the solder in the reservoir. The groove 6 is connected to the reservoir 3 by a passageway formed by the vertical hole 7 and the horizontal hole 8. The holes 7 and 8 may be formed in the block 3 by drilling—the open end of the hole 8 being plugged as shown at 9—and the diameter of the hole 7 is so small that molten solder is drawn through the hole to the groove 6 by capillary action.

In the modification shown in Figure 2 a plunger 10 is provided for applying pressure to the surface of the solder in the reservoir 3 to force the solder through the holes 7 and 8 to the groove 6. This plunger may be used in conjunction with capillary action as described above or it may be used as an alternative to capillary action and in that case the diameter of the hole 7 may be considerably larger than that mentioned above.

The tip 4 in the device just described is formed as an integral part of the block 1. It may, however, if desired, be formed as a separate part as shown in Figure 3 and in this case it may be made of material different from that of the block. For example the block may be made of copper and the tip of carbon or other suitable material. It will be observed that in the arrangement shown in Figure 3 only the tip is formed with a passageway of small diameter and the passageway in the block is of larger diameter.

As an alternative to the use of a plunger for applying pressure to the solder the arrangement indicated in Figure 4 may be adopted. In this arrangement the reservoir 3 is sealed and air or other gas under pressure is introduced above the solder from a container or compressor 11.

In the second form of soldering device shown in Figure 5 a metal block 12 is mounted in a reservoir 13 for solder. The block 12 is provided on its upper face with a groove 6 and there is a passageway 7 of small diameter leading to this groove from holes 14 in the bottom of the block open to the solder in the reservoir 13. The block 12 is provided with a second passageway 15 through which flux may be fed to the groove 6. This passageway, which may also be provided in the other arrangements shown in the drawings, may be heat-insulated from the remainder of the block in order to prevent the flux becoming overheated on its way to the groove. The passageway 15 communicates with a tube 25 through which the flux is supplied and if desired the passageway may be of such small diameter that the flux is drawn through it by capillary action to the groove 6. This form of the device is intended for use on an electric hot plate or a gas ring and in use molten solder is drawn by capillary action from the reservoir 13 up through the passageway 7 to the groove 6, the level of the solder in the reservoir being indicated at 26.

In the form of the device shown in Figure 6 solder in wire form as shown at 16 is fed upwardly through a passageway 31 of suitable cross-section in a metal block 17, the solder being guided by means of rollers 18. The block 17 is surrounded by an electric heating coil 19 which is arranged to melt the solder in the upper part of the passageway 31. The passageway 7 extends from the latter and has the molten solder forced into or through it by the incoming wire so that the molten solder passes to an arcuate groove 6 forming the solder-applying surface in the upper face 20 of the block.

When capillary action is utilised for maintaining the solder-applying surface supplied with molten solder it may in some cases be found desirable to provide more than one passageway such as 7 in order to maintain a sufficient supply of molten solder on the solder-applying surface. In Figure 6 one additional solder-conducting passageway 28 is shown but more than one additional passageway may be provided according to the amount of solder required to be supplied to the solder-applying surface. Figure 6 also shows the flux-conducting passageway 15 formed in a portion 29 of the soldering tip which is heat-insulated from the remainder of the tip by insulation 30.

The arrangement shown in Figure 7 is similar to that just described except that the solder is fed horizontally through the block and the face 20 lies vertically in use. If in such a construction it is desired to utilise capillary action for supplying solder to the solder-applying surface the modified arrangement of passageways shown in Figure 8 may be employed. In this case the passageway 31 is formed at a lower level so that an upwardly inclined passageway 27 of small cross-section may extend from it to the groove 6.

One application of the soldering devices described above is to the closing by solder of the aperture 21 through which the rip-wire 22 protrudes in a can end-closure of the kind shown in Figure 11 and described in my Patent 2,329,328. In this can end-closure the rip-wire is held in a groove 23 on the inside of the end-closure and it extends through the aperture 21 to the outside of the closure to provide a portion 24 which may be gripped and pulled when it is desired to open the can. When it is desired to apply solder to the aperture 21 to close it, this may readily be effected by introducing the portion of the groove of the can closure in which the aperture 21 is formed into the groove 6 in any of the foregoing devices. As can be seen in Figures 2 and 5 the groove 6 is slightly curved as viewed in plan to conform to the curve of the groove portion of the end-closure. In Figure 1 there is shown, in chain-line, a can-closure in position for soldering, and it will be seen that the groove portion of the end-closure is in this view shown as being deeper than the groove 6, and the remainder of the end-closure is spaced slightly from the soldering tip. Alternatively, the groove portion of the end-closure may be of the same depth as the groove 6 as illustrated in Figure 1a so that the neighbouring portions of the end-closure will engage with the end face of the soldering tip 4 and be heated thereby. The can-closures may be presented to the soldering device automatically and the arrangement may either be such that the can-closure is moved downwardly to bring its groove portion into contact with the soldering tip or such that the soldering device or tip is moved upwardly to engage the can-closure. For different purposes the soldering tip and/or the groove 6 may be modified in shape to suit the shapes of articles to which the solder is to be applied, and where there is provided a plurality of passageways, such as 7 and 28 in Figure 6, different passageways may open on to different solder-applying surfaces which may be at different levels.

From Figure 11 it will be seen that the portion 24 of the rip-wire terminates in a loop 32 to facilitate gripping the rip-wire and the loop 32 is anchored by solder at 33 to a central part of the end-closure. It may be found convenient to apply the solder at 33 at the same time as the solder is applied to the aperture 21 and for this purpose the soldering device may be modified as shown in Figure 9. In this modification the block 1 of Figure 1 is continued to the right as indicated at 34 and carries a second soldering tip 35 corresponding to the tip 4 but set at right angles thereto. The tip 35 has a solder-applying surface formed by a groove 36 corresponding to the groove 6 and solder is applied to the groove 36 through a passageway 37 of fine bore corresponding to the passageway 7. The passageway 37 extends from the passageway 8 which is continued through the block-portion 34.

In Figure 10 there is shown a further modification wherein a soldering tip 38 and solder reservoir 39 which are relatively movable are connected by a flexible pipe 40. The latter is connected to passageways 41 and 42 formed respectively in the reservoir 39 and soldering tip 38, with the passageway 41 extending from the bottom of the hole 3 and with the passageway 42 closed at one end by a plug 43 and communicating with the passageway 7 in the soldering tip 38. The reservoir 39 and the tip 38 may be heated separately the tip being heated, say, by an electrical heating coil 19. The construction of Figure 10 permits limited raising and lowering of the soldering tip 38 to permit it to be advanced towards and retracted away from the work to be soldered, while still permitting the supply of solder to the groove 6 by capillary action.

In a further method of procedure with the improved soldering device according to any of the forms described wherein a reservoir similar to that of Figure 1 is employed, the supply of molten solder to the solder-applying surface may be maintained by maintaining the level of the solder in the reservoir at the same height as the solder-applying surface. This can be effected by replenishing the supply of solder in the reservoir at the same rate as the solder is abstracted from the solder-applying surface, or, with the construction of Figure 10, by progressively raising the reservoir or lowering the soldering tip.

The invention includes the method of soldering which is characterised by the step of supplying molten solder to the solder-applying surface through an internal passageway leading to the surface in accordance with the requirements of the soldering operation.

By the invention the amount of solder applied to the work can be controlled with ease and soldering operations such as the closing of the hole in a can-closure as described above can be performed quickly and neatly.

It is to be understood that the invention is not restricted to the precise constructional details set forth in the above example. Thus, the solder-applying surface need not be in the form of a groove and its shape may be varied to suit the particular work to which the solder is applied. In some cases for example it may be in the form of a circular depression. Further, in any of the constructions shown employing an uncovered reservoir for the supply of solder such reservoir may be provided with a suitable covering to prevent the solder from becoming oxidised and to prevent ingress of foreign matter.

I claim:

1. A soldering device comprising a block having a surface with a depression therein exposed from above, a bore extending upwardly through said block into said depression, means for feeding soldering wire into said bore, and means for heating said block to melt the solder at a point spaced below said depression, a capillary passage between said point and said depression whereby molten solder is elevated through the passage to the depression by capillary action.

2. A soldering device for performing a localized soldering operation, comprising a metal block having a vertical passage formed therein, means for melting solder in the upper part of said passage, a soldering tip having a vertical passage therein registering with the passage in said block and having the upper part of said passage of capillary dimensions, means for feeding a wire of solder into the end of said passage in said block remote from said soldering tip, whereby feeding movements of said wire displace molten solder from said passage in said block into said passage in said soldering tip.

3. A soldering device for performing a localized soldering operation, comprising a metal block having a vertical passage formed therein, electric means for melting solder in the upper part of said passage in said block, a soldering tip having a vertical passage formed therein registering with the passage in said block and having the upper part of said passage opening into an arcuate groove in the upper face of said tip and being of capillary dimensions, means for feeding a wire of solder into the end of said passage in said block remote from said soldering tip, whereby feeding movements of said wire displace molten solder from said passage in said block into said passage in said soldering tip.

PETER BOGNER.